United States Patent [19]

Grube et al.

[11] Patent Number: 5,055,135
[45] Date of Patent: Oct. 8, 1991

[54] FLAME RETARDANT BITUMEN

[75] Inventors: Louis L. Grube, Bound Brook; Stanley P. Frankoski, West Milford, both of N.J.

[73] Assignee: GAF Building Materials Corporation, Wayne, N.J.

[21] Appl. No.: 632,219

[22] Filed: Dec. 21, 1990

Related U.S. Application Data

[63] Continuation-in-part of Ser. No. 394,892, Aug. 17, 1989, abandoned.

[51] Int. Cl.$^5$ .................. C08L 95/00; C09K 21/00
[52] U.S. Cl. .................. 106/281.1; 106/18.13; 52/408; 52/307.13; 252/601; 428/228
[58] Field of Search .................. 106/18.13, 281.1; 252/601, 606; 52/408, 307.13; 428/228

[56] References Cited

U.S. PATENT DOCUMENTS 4,659,381 4/1987 Walters .................. 106/281

FOREIGN PATENT DOCUMENTS 1005202 2/1977 Canada.

*Primary Examiner*—Michael Lewis
*Assistant Examiner*—Mary C. DiNunzio
*Attorney, Agent, or Firm*—Marilyn J. Maue; Joshua J. Ward

[57] ABSTRACT

This invention relates to a stabilized, flame retardant roofing mat or sheeting impregnated with a composition comprising, a copolymeric styrene modified asphalt and a critical amount of between 35 and about 50 wt. % of colemanite. The invention also relates to the novel flame retardant composition which can be employed for treating roofing reinforcement and building siding material.

12 Claims, No Drawings

FLAME RETARDANT BITUMEN

This application is a continuation-in-part of copending patent application Ser. No. 394,892, filed on Aug. 17, 1989, now abandoned.

BACKGROUND OF THE INVENTION

Roofing sheets are generally supplied in rolled up form for use in the formation of roofing membranes wherein overlapping sections of the material are used to form one or more plies of the finished roofing membranes. In addition they may be used on sidewalls of buildings. Such roofing membranes and systems are used primarily on commercial buildings or buildings of low slope by reason of their durability and comparatively low cost. One type of roofing sheet which is in demand for economical installations is a thermoplastic styrene modified asphalt sheet. Roofing material modified with copolymeric styrene elastomers and rubbers are particularly in demand where some degree of flexibility is required, e.g. in built-up roofing to absorb the stresses during construction and to eliminate strain for the lifetime of the roof. However, a major disadvantage associated with the use of such copolymeric styrene modifiers is flammability, thus such modified asphalts do not provide roofing material having a required flame retardancey. Consequently, it has been the practice to manufacture the sheet with a glass mat reinforcement and to cover it with a separate flame retardant composition such as a glass cap sheet or coating. Obviously, this procedure requires several time consuming steps to complete the roofing installation. Therefore, it is an aim of research to simplify the process of manufacturing and installation of a fire resistant asphaltic roofing sheet. Several asphaltic compositions have been proposed which meet commercial specifications of char formation in a 90 second burn test but have failed the ASTM E-108 flame spread test required for commercial use and Class A rating.

Accordingly, it is an object of this invention to simplify the operation necessary for providing a fire retardant roofing membrane having a Class A rating.

Another object is to eliminate the necessity for a glass mat reinforcement either alone or in addition to the polyester reinforcment in the sheet and to provide a fire retardant roof covering with a material which incorporates fire retardancy, thus eliminating the need for membranes of different composition and top coating operations.

These and other objects will become apparent from those skilled in the art from the following description and disclosure.

THE INVENTION

In accordance with this invention there is provided a modified asphalt sheet which is impregnated, i.e. saturated or coated on its upper and/or lower surfaces with a composition comprising (a) between about 35 and about 60 wt. % petroleum asphalt or an asphaltic blend having a Brookfield viscosity at 210° F. of between about 500 and about 4,000 cps, a penetration at 77° F. (100 g., 5 seconds, mm/10) of from about 20 to about 350 dmm and a softening point of from about 80° to about 200° F.; (b) between about 2 and about 30 wt. % of a styrene copolymeric modifier and (c) a critical amount of colemanite between 35 and about 50 wt. %, combined to provide 100% composition.

In the above composition, the asphaltic component is more desireably used in a concentration of from about 45 to about 55 wt. % and is preferably one having a viscosity of from about 1500 to about 3000 cps; a penetration of from about 80 to about 200 dmm and a softening point of from about 100° to about 150° F. Such asphalts include roofing flux, straight reduced, thermal and air blown asphalts, mopping asphalt, liquid cut-back asphalts, etc. It will be apparent that asphalts of relatively lower penetration and higher viscosity can be employed when diluted with a cutting oil, such as for example, gas oil, to provide the asphaltic component having properties within the above ranges.

Suitable modifier components are those styrene copolymeric thermoplastic rubbers conventionally employed for saturation of polyester roofing mat, and include a styrene-butadiene, styrene-ethylene-butadiene-styrene, styrene-butadiene-styrene block copolymers or styrene-butadiene-rubber containing from about 10 to about 50 wt. % styrene, preferably from about 25 to about 35 wt. % styrene. The styrene copolymer generally comprises between about 2 and about 20 wt. %, preferably between about 8 and about 15 wt. % of the composition.

Colemanite is a natural blend of hydrated oxides as represented by a particular type of calcium borate generally containing between about 30 and about 55% $B_2O_3$ and between about 20 and about 35% CaO. This mineral may also contain up to about 12% other oxides such as silicon dioxide, aluminum oxide and magnesium oxide. The colemanite is used in the present composition in a concentration not less than 35 wt. %, preferably from about 40 to about 48 wt. % of the composition and is generally employed as granular material having a mesh size of from about 75% to about 80% minus 200 mesh screen.

Although lesser amounts of colemanite in the composition, e.g. 13–28 wt. %, have been found to pass char formation and vertical flow tests on non-insulated roofing, such compositions are impractical for modern use since most roofing constructions require insulation as a means of controlling fuel costs Also, it has now been found that while compositions containing less than 35 wt. % colemanite provide satisfactory length of flame spread, they fail to achieve a class A rating because of their inability to meet lateral flame spread criteria.

A particular advantage of colemanite is its high cost effectiveness and availability over other borate compounds. Further compositions containing colemanite, within the above critical ranges, can be easily applied to polyester mats to achieve a Class A rating in the ASTM E-108 and UL 790 fire tests. Consequently, it is not necessary to apply a separate fire retardant top coating to the modified asphalt membrane. Also, the need for glass mat reinforcement is completely eliminated. Thus, greater fire protection as well as improved tensile strength, elongation, penetration and tear resistance is afforded by coverage with the present inherently fire resistant roofing ply or plies. It is to be understood, however, that the present composition is also suitable for coating or impregnation of other reinforcing mats such as glass mats, glass/polyester composites, etc.

The roofing membrane can be a mono or multi ply structure depending on the desired thickness of the roof covering. Generally, a thickness of from about 0.07 to about one inch is sufficient to provide good weathering; although between about 0.12 and about 0.2 inch roofing thickness is recommended.

The method of coating a reinforcing mat is conventional and includes dipping, spraying, soaking or mechanical coating with a doctor blade or similar device. When coating a surface of the mat, the present composition is generally applied in a thickness of from about 0.05 to about 0.5 inch. Saturation of the mat provides inherent fire retardant throughout the felt.

The present composition is easily prepared by mixing the components in any order of addition at a temperature of from about 100° to about 400° F. for a period of from about 1 to 24 hours, preferably at about 325°–400° F. for 2 to 6 hours The composition is then applied to the mat at about the same temperature to provide a product suitable for installation. The roofing sheet obtained shows no deterioration in flexibility so that it can be easily unrolled for overlaying a roof deck and can be easily handled in roofing construction.

Many methods of roofing can be employed for the purposes of this invention. For example, the present roofing sheet can be utilized as the sole roof covering over the entire deck or a base and top covering with instant roofing sheet can be combined with intermediate roofing layers of a different composition, e.g. an impregnated or non-impregnated glass mat, if so desired. Also, alternate layers of roof covering can be employed. The specific roofing procedure for installation is conventional and need not be further discussed.

Having generally described the invention, reference is now had to the following examples which are provided to illustrate preferred embodiments but which are not to be construed as limiting to the scope of the invention as more broadly discussed above and as defined in the appended claims.

product was then subjected to a flame test which comprised subjecting a 4×8 inch sample of the above, mounted on a 1"/ft slope to the frame of a propane burner for 90 seconds.

A full sized roll of roofing sheet having the above composition was prepared and sent to Underwriters Laboratories (Northbrook, Ill.) for fire retardancy testing and quality classification over a non-insulated roof deck.

B. The preparation of the above melt was repeated and applied in a similar manner and thickness to a roofing deck overlaid with 4 inches of isotherm insulation under the roofing mat. The results of tests A and B are as reported in Table I.

EXAMPLE 2

The following ingredients for a flame retardant composition were introduced into a metal container and mixed for 4 hours at 380° F.

| Ingredients | wt. % |
| --- | --- |
| (2) Asphalt (penetration 130 dmn) | 52.1 |
| (3) Kraton 1101 | 4.9 |
| (4) Kraton 1102 | 3.0 |
| Colemanite | 40.00 |

The above melt was tested as in parts 1A and 1B and the results reported in Table I. This example passed all criteria for a Class A rating. Compositions containing 35 wt. % colemanite also meet the criteria acceptable in vertical/lateral flame tests and high char formation required for a Class A rating.

TABLE I

| | 90 Second Burn Test | | ASTM E-108 UL 790 - 10 Minute Test | |
| --- | --- | --- | --- | --- |
| Product Tested | Extent of Char Formation | Extent of Flow | Verticle Flame Spread 6' Max | Lateral Flame Spread |
| Example 1 | | | | |
| A | good | slight | pass | pass |
| B | good | slight | pass | failure* |
| Example 2 | | | | |
| A | excellent | none | pass | pass |
| B | excellent | none | pass | pass |
| Commercial Sample Manville Dynakap FR SBS** | excellent | none | pass | pass |
| Commercial Sample Siplast Paradiene FR SBS** | very good | none | pass | pass |

*over 6 minutes flame continues to spread laterally
**A test only

EXAMPLE 1

The following ingredients for the flame retardant composition were introduced into a metal container and mixed for 4 hours at 380° F.

| Ingredients | wt. % |
| --- | --- |
| (2) Asphalt (Penetration 130 dmm) | 65.62 |
| (3) Kraton 1101 | 6.00 |
| (4) Kraton 1102 | 3.38 |
| Colemanite | 25.00 |

(2) softening point 120° F.
(3) 31/69 styrene-butadiene copolymer, 0.94 specific gravity, Brookfield viscosity (toluene solution) at 77° F., 4,000 cps (25 wt. % polymer)
(4) 28/72 styrene-butadiene copolymer, 0.94, Brookfield viscosity (toluene solution) at 77° F., 1,200 cps (25 wt. % polymer).

A. The above melt was applied to a 12×20 inch sheet of polyester roofing mat (0.038" thick) by coating on a 2 roll mill to build a thickness of 0.157". The resulting

What is claimed is:

1. A flame retarding roofing or siding membrane composition which comprises:
   (a) between about 35 and about 60 wt. % of a petroleum asphalt or asphaltic blend having a Brookfield viscosity of from about 500 to 4,000 cps, a penetration of from about 20 to 350 dmm and a softening point of from about 80° to 200° F.;
   (b) between about 2 and about 30 wt. % of a thermoplastic copolymeric styrene modifier and
   (c) between 35 and about 50 wt. % of colemanite, combined to provide 100% composition.

2. The composition of claim 1 wherein said component (a) has a viscosity of from about 1500 to 3000 cps; a penetration of from about 80 to 200 dmm and a softening point of from about 100° to 150° F.

3. The composition of claim 1 wherein said component (b) is selected from the group of styrene-butadienestyrene and styrene-ethylene butadiene-styrene block polymers and blends thereof.

4. The composition of claim 3 wherein between about 5 and about 20 wt. % of component (b) is present in the composition.

5. The composition of claim 1 wherein said component (b) is an elastomeric styrene-butadiene-styrene block copolymer.

6. The composition of claim 1 wherein said component (b) is a rubber and is selected from the group of styrene-butadiene, styrene-butadiene-rubber, styrene-ethylene-butadiene-styrene and styrene-butadiene-styrene block copolymers containing from about 10 to about 50 wt. % styrene.

7. The composition of claim 6 wherein between about 5 and about 20 wt. % of said copolymer is present in the composition.

8. The composition of claim 1 wherein between about 40 and about 48 wt. % of colemanite is present in the composition.

9. A roofing installation containing between about 40 and about 95 wt. % of the composition of claim 1.

10. A glass mat roofing installation of claim 9 having a thickness of from about 0.07 to about 0.25 inch.

11. A roof deck overlaid with a layer of the material of claim 9.

12. A building siding covered with a layer of the material of claim 9.

* * * * *